US008719896B2

(12) United States Patent
Poulsen et al.

(10) Patent No.: US 8,719,896 B2
(45) Date of Patent: May 6, 2014

(54) WIDGET HOST CONTAINER COMPONENT FOR A RAPID APPLICATION DEVELOPMENT TOOL

(75) Inventors: Thomas Poulsen, Los Gatos, CA (US); Terence Munday, Menlo Park, CA (US); Trevor Mathers, Portland, OR (US); Manohar Golla, Vittal Nagar Godavarikhani (IN)

(73) Assignee: Oracle International Corporation, Redwood Shores, CA (US)

( * ) Notice: Subject to any disclaimer, the term of this patent is extended or adjusted under 35 U.S.C. 154(b) by 445 days.

(21) Appl. No.: 12/211,784

(22) Filed: Sep. 16, 2008

(65) Prior Publication Data

US 2010/0071026 A1 Mar. 18, 2010

(51) Int. Cl.
*G06F 17/00* (2006.01)
*G06F 3/048* (2013.01)

(52) U.S. Cl.
USPC ............... 726/1; 709/217; 715/762; 715/234

(58) Field of Classification Search
USPC .................. 726/1; 709/217; 715/762, 234
See application file for complete search history.

(56) References Cited

U.S. PATENT DOCUMENTS

| 7,546,543 | B2* | 6/2009 | Louch et al. .................. 715/762 |
| 7,707,514 | B2 | 4/2010 | Forstall et al. |
| 7,743,336 | B2 | 6/2010 | Louch et al. |
| 7,917,858 | B2* | 3/2011 | Pereira et al. ................. 715/762 |
| 8,015,491 | B2 | 9/2011 | Shaver et al. |
| 8,056,092 | B2* | 11/2011 | Allen et al. .................... 719/320 |
| 8,150,939 | B1* | 4/2012 | Murray .......................... 709/217 |
| 8,166,071 | B1* | 4/2012 | Korablev et al. .............. 707/783 |
| 2001/0052108 | A1 | 12/2001 | Bowman-amuah |
| 2002/0049603 | A1* | 4/2002 | Mehra et al. ...................... 705/1 |
| 2002/0120859 | A1* | 8/2002 | Lipkin et al. ................... 713/200 |
| 2002/0138719 | A1* | 9/2002 | Farkas et al. ...................... 713/1 |
| 2003/0051136 | A1* | 3/2003 | Curtis et al. ................... 713/163 |
| 2003/0061482 | A1* | 3/2003 | Emmerichs ................... 713/165 |
| 2003/0222918 | A1* | 12/2003 | Coulthard ..................... 345/780 |
| 2004/0046789 | A1 | 3/2004 | Inanoria |
| 2004/0059587 | A1* | 3/2004 | Astle et al. ........................ 705/1 |
| 2004/0111428 | A1 | 6/2004 | Rajan et al. |
| 2005/0010880 | A1 | 1/2005 | Schubert et al. |
| 2005/0044423 | A1* | 2/2005 | Mellmer et al. .............. 713/201 |
| 2005/0177837 | A1* | 8/2005 | Mensah et al. ................ 719/328 |
| 2005/0193368 | A1* | 9/2005 | Becker et al. ................. 717/106 |

(Continued)

OTHER PUBLICATIONS

U.S. Appl. No. 12/211,795, Non Final Office Action mailed on Oct. 3, 2013, 27 pages.

(Continued)

*Primary Examiner* — Techane Gergiso
(74) *Attorney, Agent, or Firm* — Kilpatrick Townsend & Stockton (57) ABSTRACT

A widget host container serves as a component that may be added via a rapid application development tool, such as Oracle International Corporation's Application Development Framework. The rapid application development tool may be used to install the widget host container, for example, in a region of a user interaction environment, such as an application or a suite of user interactive applications, created by the rapid application development tool. If desired, one or more selection devices, such as a drop down menu, may be provided to select particular widgets for use and display. Features may be provided for organizing both personal and enterprise widgets. Security settings control access to web widgets, and an option to allow or restrict access to web widget display options in the container.

19 Claims, 6 Drawing Sheets

(56) References Cited

U.S. PATENT DOCUMENTS

| | | | |
|---|---|---|---|
| 2006/0048225 A1* | 3/2006 | Gomez et al. | 726/22 |
| 2006/0168536 A1* | 7/2006 | Portmann | 715/762 |
| 2006/0277481 A1 | 12/2006 | Forstall et al. | |
| 2007/0079383 A1* | 4/2007 | Gopalakrishnan | 726/26 |
| 2007/0083378 A1* | 4/2007 | Guarraci et al. | 705/1 |
| 2007/0101146 A1* | 5/2007 | Louch et al. | 713/176 |
| 2007/0101433 A1* | 5/2007 | Louch et al. | 726/25 |
| 2007/0288858 A1* | 12/2007 | Pereira et al. | 715/764 |
| 2008/0034309 A1* | 2/2008 | Louch et al. | 715/766 |
| 2008/0040426 A1 | 2/2008 | Synstelien et al. | |
| 2008/0052348 A1* | 2/2008 | Adler et al. | 709/203 |
| 2008/0091952 A1* | 4/2008 | Sumner et al. | 713/185 |
| 2008/0141141 A1* | 6/2008 | Moore et al. | 715/748 |
| 2008/0141153 A1* | 6/2008 | Samson et al. | 715/769 |
| 2008/0141341 A1* | 6/2008 | Vinogradov et al. | 726/2 |
| 2008/0148283 A1* | 6/2008 | Allen et al. | 719/316 |
| 2008/0195483 A1* | 8/2008 | Moore | 705/14 |
| 2008/0215879 A1* | 9/2008 | Williams et al. | 713/159 |
| 2008/0215998 A1* | 9/2008 | Moore et al. | 715/762 |
| 2008/0222232 A1 | 9/2008 | Allen et al. | |
| 2008/0222658 A1 | 9/2008 | Allen et al. | |
| 2008/0244293 A1* | 10/2008 | Morris | 713/324 |
| 2008/0255962 A1* | 10/2008 | Chang et al. | 705/27 |
| 2008/0271127 A1* | 10/2008 | Naibo et al. | 726/6 |
| 2008/0301460 A1* | 12/2008 | Miller et al. | 713/183 |
| 2008/0307385 A1* | 12/2008 | Dreiling et al. | 717/108 |
| 2008/0320446 A1 | 12/2008 | Redpath | |
| 2008/0320466 A1 | 12/2008 | Dias | |
| 2009/0013310 A1 | 1/2009 | Arner et al. | |
| 2009/0044138 A1 | 2/2009 | Rudolph et al. | |
| 2009/0070692 A1 | 3/2009 | Dawes et al. | |
| 2009/0077623 A1 | 3/2009 | Baum et al. | |
| 2009/0077624 A1* | 3/2009 | Baum et al. | 726/1 |
| 2009/0172021 A1* | 7/2009 | Kane et al. | 707/104.1 |
| 2009/0228838 A1 | 9/2009 | Ryan et al. | |
| 2009/0235149 A1 | 9/2009 | Frohwein | |
| 2009/0247134 A1* | 10/2009 | Jeide et al. | 455/414.2 |
| 2009/0249282 A1* | 10/2009 | Meijer et al. | 717/104 |
| 2009/0254745 A1* | 10/2009 | Ganesan | 713/151 |
| 2009/0307609 A1 | 12/2009 | Ganz et al. | |
| 2009/0313601 A1 | 12/2009 | Baird et al. | |
| 2009/0320105 A1* | 12/2009 | Jurkiewicz et al. | 726/5 |
| 2010/0070886 A1 | 3/2010 | Poulsen et al. | |
| 2010/0070968 A1 | 3/2010 | Poulsen et al. | |
| 2010/0114739 A1 | 5/2010 | Johnston | |
| 2010/0299598 A1 | 11/2010 | Shin et al. | |
| 2010/0305999 A1 | 12/2010 | Fujioka | |

OTHER PUBLICATIONS

U.S. Appl. No. 12/211,795, Office Action mailed on Jan. 24, 2012, 19 pages.

U.S. Appl. No. 12/211,795, Office Action mailed on Jul. 6, 2012, 21 pages.

U.S. Appl. No. 12/211,795, Office Action mailed on Feb. 4, 2013, 23 pages.

U.S. Appl. No. 12/211,795, Office Action Response filed on Apr. 24, 2012, 18 pages.

U.S. Appl. No. 12/211,801, Final Office Action mailed on Apr. 13, 2011, 14 pages.

U.S. Appl. No. 12/211,801, Non-Final Office Action mailed on Dec. 21, 2010, 10 pages.

U.S. Appl. No. 12/211,801, Non-Final Office Action mailed on Aug. 24, 2011, 15 pages.

U.S. Appl. No. 12/211,801, Non-Final Office Action mailed on Sep. 26, 2013, 16 pages.

U.S. Appl. No. 12/211,801, Office Action mailed on Mar. 8, 2012, 16 pages.

* cited by examiner

WIDGET HOST CONTAINER COMPONENT FOR A RAPID APPLICATION DEVELOPMENT TOOL

BACKGROUND OF THE INVENTION

A desktop widget is a small specialized graphical user interface (GUI) application that provides some visual information and/or easy access to frequently used functions such as clocks, calendars, news aggregators, calculators and desktop notes. A widget engine is a software service available to users for running and displaying desktop widgets on the desktop of a computer. Desktop widgets are different than web widgets. Web widgets are hosted remotely and run inside a web page. Web widgets allow anyone to create a website by embedding content or tools from one site onto a page of another site. In contrast, a desktop widget is a desktop-based mini-application that is hosted locally. A desktop widget shows discrete information and is often connected to the Internet to provide content.

One of the most popular desktop widgets is YAHOO! Widgets. YAHOO! Widgets provide an XML/JavaScript solution to building simple components for a person's desktop. These components, however, like all desktop widgets, have to be rendered by a proprietary YAHOO! widget engine installed on a user's desktop. Installing desktop widgets on a user's computer may result in clutter of a work computer's desktop with applications that are for personal use. In addition, such desktop widgets cannot currently be installed in an application or as part of a user interface because the desktop widgets require the proprietary widget engine to run, and the widget engine must be installed on the desktop.

From an enterprise perspective, there is no way to administrate desktop widgets as most desktop widgets, including YAHOO! Widgets, require a manual download to the desktop of the widget engine, and once a user has installed this application, the user can download any number of widgets the user chooses, including widgets that may contribute to the employee's efficiency, but also many widgets that are of a personal nature and which may reduce efficiency. Businesses that wish to develop or promote widgets that are useful to their employees or clients have to contend with the possibility that employees will take advantage of the presence of the desktop widget engine on their desktop to download non-business essential desktop widgets.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description of some embodiments that are presented later.

In accordance with an embodiment, a widget host container is provided for hosting locally run widgets. The widget host container includes many of the functions of a desktop widget engine, but is included as part of the user interface component, and thus may be installed as part of an application or in a user interaction environment.

The widget host container serves as a component that may be added via a rapid application development tool, such as Oracle International Corporation's Application Development Framework. The rapid application development tool may be used to install the widget host container, for example, in a region of a user interaction environment, such as an application or a suite of user interactive applications, created by the rapid application development tool. If desired, multiple options may be provided in terms of regions to provide the widget host container. In addition, one or more selection devices, such as a drop down menu, may be provided to select particular locally hosted widgets for use and display. Tabbed pages may be provided on a display for the container for organizing both personal and enterprise widgets.

In accordance with an embodiment, an administrator may seed the widget host container with a specific widget or widgets and, if the administrator so chooses, may provide customization and preference options to users to manage their own widgets. Different users may be presented with different sets of widgets based upon their security clearance and/or profiles.

In an embodiment, the widget host container includes a parser, such as an XML interpreter, for interpreting a widget configuration file. The widget host container may also include a library containing code, such as JavaScript code, that performs actions requested by the interpreted widget configuration file. Alternatively, the library may map calls to code locally stored with the user interaction environment or stored remotely, such as at a centralized server.

If desired, toolbar controls may be provided for adding, hiding, or removing widgets from the display region of the widget host container component.

Other features of the invention will become apparent from the following detailed description when taken in conjunction with the drawings, in which:

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
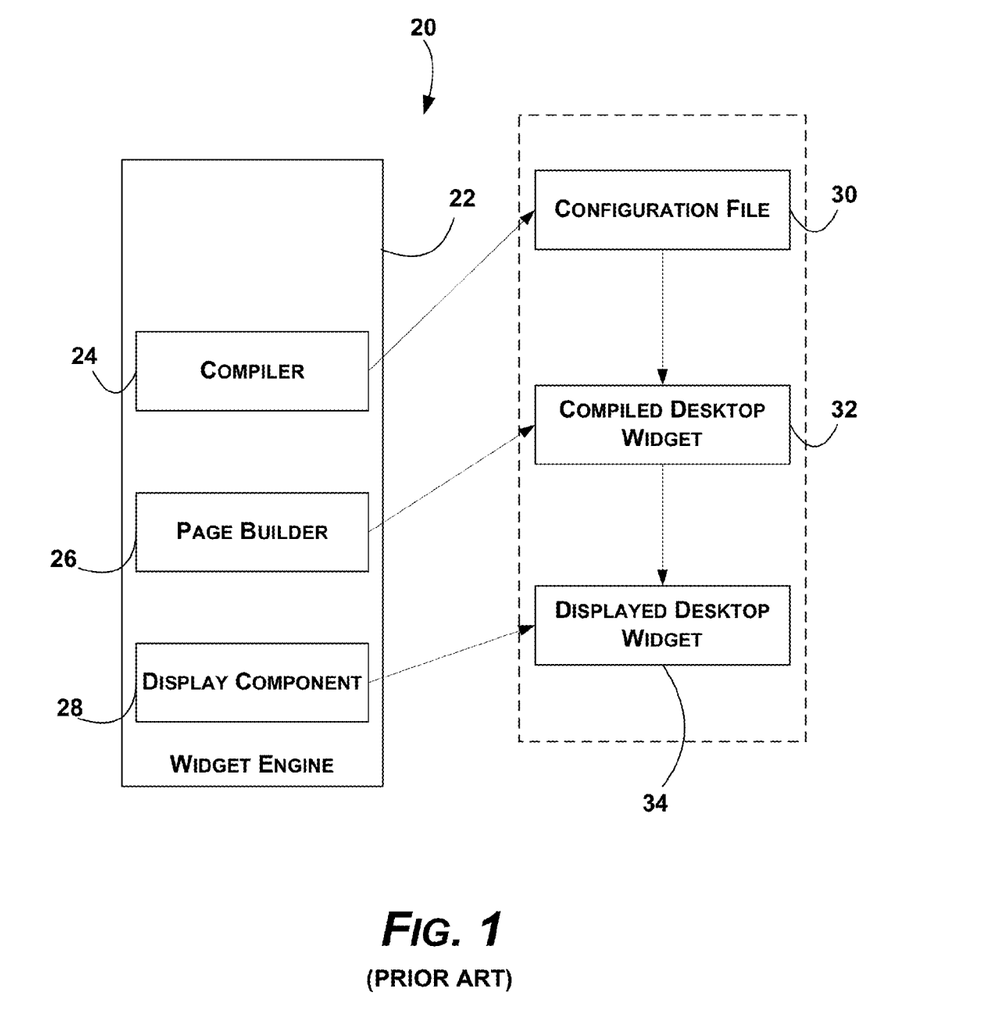
FIG. 1 is a block diagram representing a prior art YAHOO! Widget.

Referring now to the drawings, in which like reference numerals represent like parts throughout the several views, FIG. 1 shows a prior art desktop widget environment 20. The desktop widget environment 20 represents, for example, a YAHOO! Widget environment. Although some desktop widget environments may be different than shown, the basic components shown in FIG. 1 are believed to be present in most prior art desktop widget environments.

The desktop widget environment 20 includes a widget engine 22. For YAHOO! Widgets, the widget engine 22 is called KONFABULATOR. The widget engine 22 includes a compiler 24 and a page builder 26. The widget engine 22 also includes a display component 28.

For each desktop widget that is run in the desktop widget environment 20, a configuration file 30 is provided. This configuration file includes configuration information such as controls (size of display, etc.). The configuration file may also specify actions the controls will take and events that a control may return. The configuration file may include calls to the Internet to retrieve web pages or RSS, or may interact with online scripts. JavaScript calls may be made, with related code maintained by the widget engine. Configuration files are well known and documented, and for YAHOO! Widgets, are called "KON" files.

In use, the widget engine 22, and more specifically the compiler 24, configures the configuration file 30 into a compiled widget 32. This compiled widget 32, in turn, is built into a page by the page builder 26 and is displayed by the display component 28 as a displayed desktop widget 34. KONFABULATOR, for example, utilizes a JavaScript runtime environment combined with an XML interpreter. One or more widgets may be displayed by the display component 28.

As described in the background section of this document, one problem with the desktop widget environment 20 shown in FIG. 1 is that, once the widget engine 22 is installed on a user's desktop, an administrator cannot administrate what desktop widgets are downloaded and utilized by each of the users on a network. Desktop widgets may contribute to an employee's efficiency, but many widgets may do just the opposite: they may distract an employee from work tasks. In addition, display of desktop widgets on a user's desktop may result in unwanted clutter.

Figure 2:
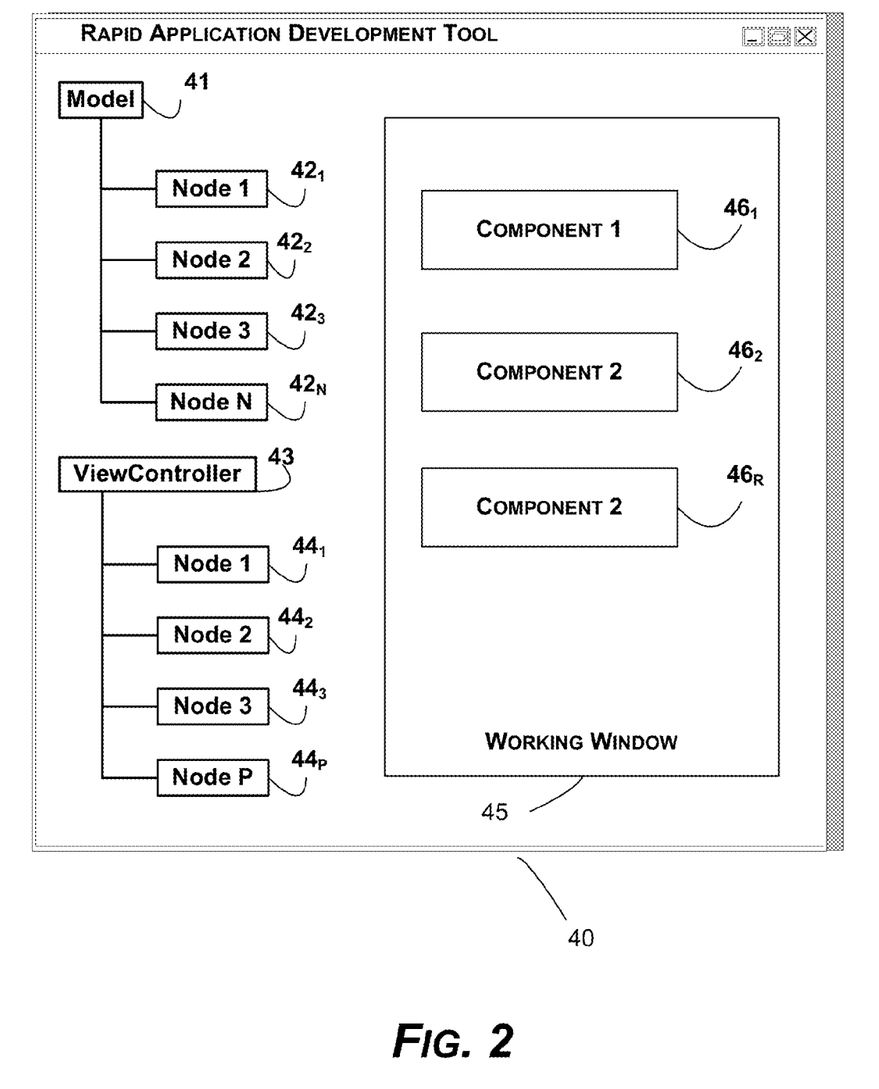
FIG. 2 is a block diagram representing components of a rapid application development tool in accordance with an embodiment.

In accordance with an embodiment, a widget host container is provided that includes functions similar to a widget engine, such as the prior art widget engine 22 described above. The widget host container may be utilized, for example, as a graphical user interface component of a rapid application development tool. Rapid application development tools, such as a rapid application development tool 40 shown in FIG. 2, are known. In general, rapid application development tools, sometimes known as integrated development environments, utilize web application frameworks or other types of software frameworks to speed application development. Prototypes or templates are provided as easily-added building blocks for user interface modules and other components of an application or another user interaction environment.

An example of a rapid application development tool is Oracle International Corporation's Application Development Framework, also called the "ORACLE ADF." ORACLE ADF is a commercial Java framework for creating enterprise applications and user interaction environments.

ORACLE ADF is based upon the model-view-controller architecture, which is well known and documented. This architecture isolates business logic (e.g., data) from user interface considerations, resulting in an application or user interaction environment where it is easier to modify either the visual appearance of a user interaction environment (e.g., an application or a suite of user interactive applications or windows) or the underlying business rules without affecting the other. In the model-view-controller architecture, the model represents the information (the data) of the application and the business rules used to manipulate that data, the view corresponds to the elements of the user interface such as text, check box items, and so forth, and the controller manages details involving the communication to the model of user actions such as keystrokes and mouse movements.

Figure 5:
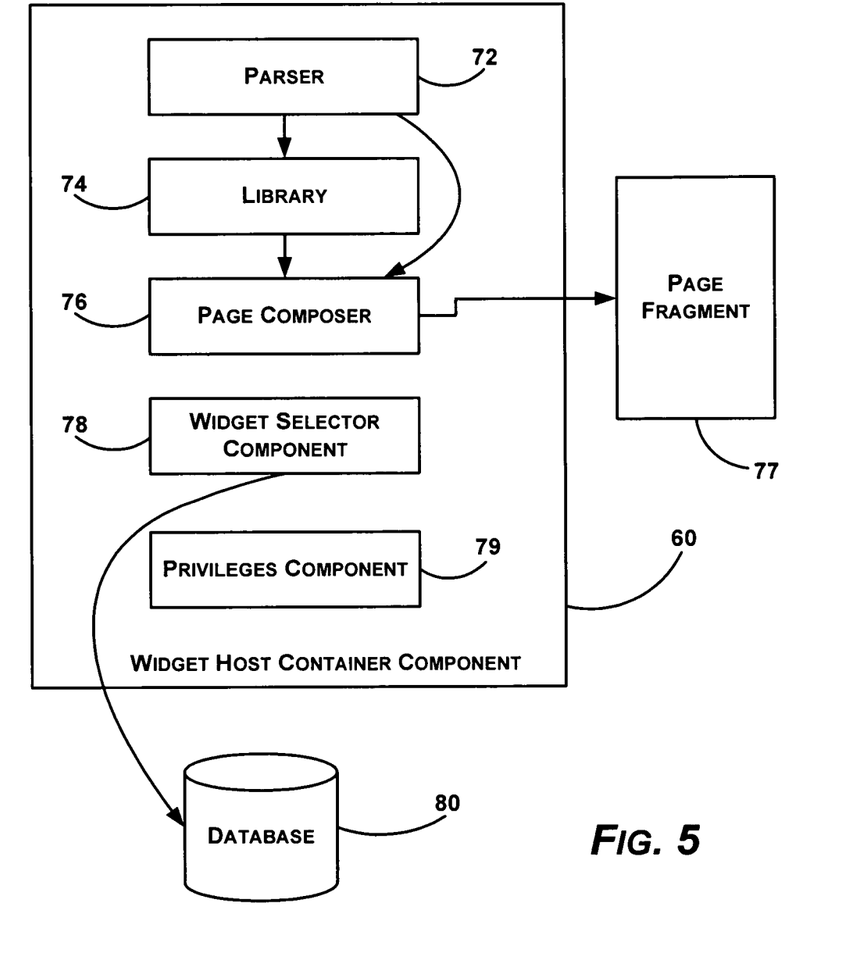
FIG. 5 is a block diagram representing components of a widget host container component in accordance with an embodiment.

The rapid application development tool 40 shown in FIG. 2 is a simplified representation of the user interface for ORACLE ADF. The rapid application development tool 40 includes a model tree 41 having nodes 42 representing data for use in creating a user interaction environment, such as a user interaction environment 50 (FIG. 5). The user interaction environment 50 may be, for example, an application or a suite of user interactive interfaces.

The rapid application development tool 40 also includes a view controller tree 43, which includes both the view and controller features of the model-view-controller architecture. Again, like the model tree 41, the view controller tree 43 includes nodes 44 that may be utilized for creating a user interaction environment 50.

The developer utilizes tools provided by the rapid application development tool 40 to create components 46 utilizing the model tree nodes 42 and the view controller nodes 44. The model tree nodes 42 and the view controller nodes 44 are bound during this process. Nodes 42, 44 may be selected for use via a wizard or other tool, or may be implemented using drag and drop or other methods. Each component may include several different options for display or function.

The components 46 may be utilized in development of an application or another user interaction environment 50. The user interaction environment 50 and/or the components 46 are typically created within the working window 45. The components 46 may be added, for example, via a wizard, using drag and drop methods, or utilizing other methods. During development of the components 46, a developer may utilize a design view, in which components 46 are viewable as user interface modules, or a source view in which the source code for the components is viewable and editable.

Although ORACLE ADF is provided as an example, the widget host container component described herein may be utilized in other rapid application development tool environments. However, for ease of description, the example herein involves use of ORACLE ADF.

One of the components, for example the component 461, of ORACLE ADF is a task flow component. A task flow is a ORACLE ADF component in which a developer defines an application task. The definition of the task includes the pages and logic that interact to allow the task flow to complete the task. At design time, the pages and page fragments that make up a task are added to a task flow as activities; in the cases of pages and page fragments they are view activities. So, when users navigate from one page to another within a task flow, they are transitioning from one activity to another. Activities can be considered the building blocks of the task flows. There are other activities besides view activities. ORACLE ADF task flows are well known and documented, so their structures are not described in detail here.

Figure 3:
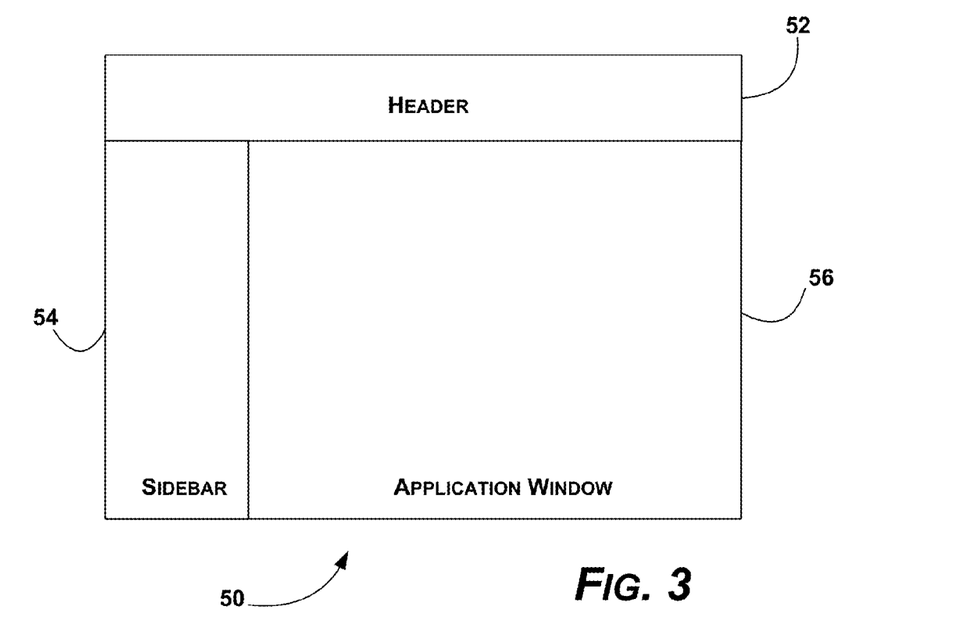
FIG. 3 is a representation of a user interaction environment created by the rapid application development tool of FIG. 2 in accordance with an embodiment.

FIG. 3 shows an example of a user interaction environment 50 developed by the rapid application development tool 40. The user interaction environment 50 in the example shown in the figure includes a header 52, a sidebar 54, and an application window 56. Each of these regions of the user interaction environment 50 may be formed by the rapid application development tool 40. The user interaction environment 50 is a suite of interactive applications, and serves as the screen view provided to each of the users on a network. The application window 56 hosts a current application used by a user. The sidebar 54 may include a collection of the components 46, and the header 52 may include a collection of components and/or links. The application window 56 may include one or more of the components 46. The user interaction environment 50 is but one example of a layout of a user interaction environment that may be provided by the rapid application development tool 40.

In embodiments, a widget host container may be utilized in any of the regions of the user interaction environment 50, including the header 52 and the sidebar 54, or specific regions within each of these areas. For example, for an embodiment where a task flow is utilized, the task flow may be placed in an upper portion of the sidebar 54 of the user interaction environment 50.

Figure 4:
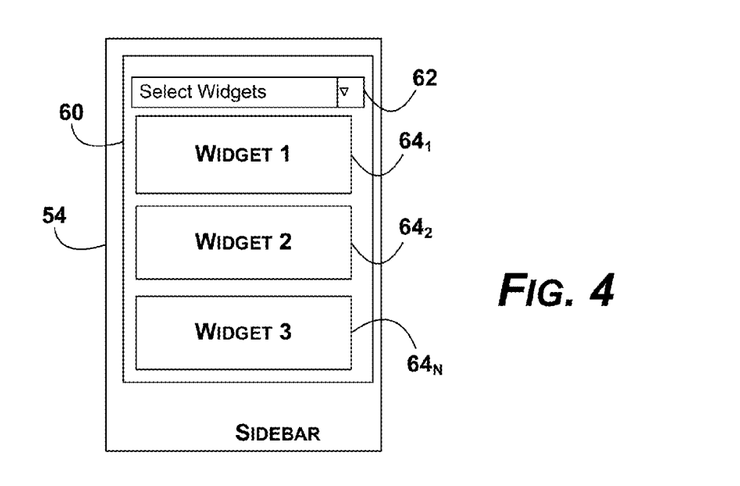
FIG. 4 is a block representation of a user interface for displaying one or more widgets in accordance with an embodiment.

In accordance with an embodiment, as shown in FIG. 4, the sidebar 54 includes a widget user interface component 60 having a drop-down menu 62 and several widgets 64 displayed. The drop-down menu 62 permits a user to select particular widgets 64 for display. This widget host container component 60 may be one of the components 46 of the rapid application development tool 40 shown in FIG. 2

In use, the widget host container component 60 is created by a component designer for the rapid application development tool 40. In the example shown in FIG. 5, the widget host container component 60 includes a parser 72, a library 74, and a page composer 76. The parser 72, the library 74, and the page composer 76 act to generate a page fragment 77 that is ready for display in the user interface 60.

Figure 8:
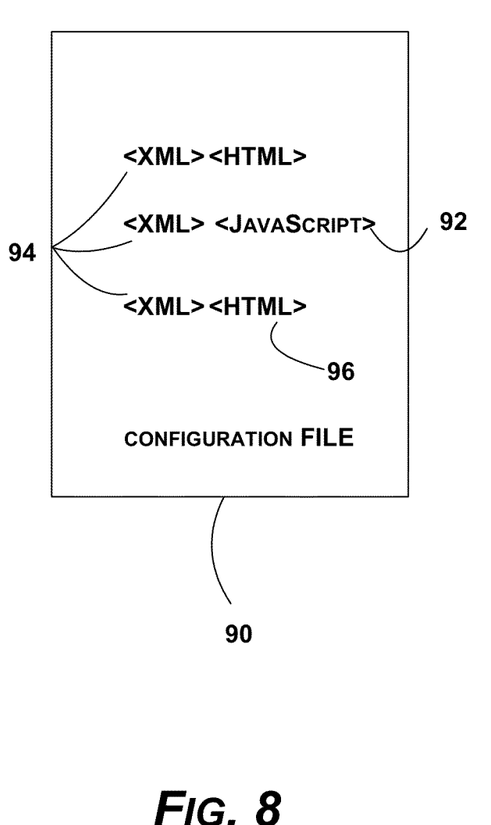
FIG. 8 shows a representation of a widget configuration file for use with the widget host container component of FIG. 5 in accordance with an embodiment.

FIG. 8 shows a representation of a widget configuration file 90 for use with the widget host container component 60 in accordance with an embodiment. The widget configuration file 90 includes code 92 that defines an activity, such as interaction with a user. In the embodiment in the drawings, the code is JavaScript. The widget 90 may include elements designated by, for example, XML tags 94. Some of the elements may include HTML 96 to define a part of a page for the web widget 90.

The component designer associates the widget host container component 60 with one or more widget configuration files 90. To this end, a database 80 may be provided for storing the widget configuration files 90. This database 80 may be maintained, for example, on a server that is associated with the user interaction environment 50. If desired, the widget configuration files 90 may be created by a developer. In an embodiment, the widget configuration files 90, when instantiated, are hosted locally by the widget host container component 60. Thus, the widgets utilized with the widget host container component 60 are more like desktop widgets than web widgets, albeit running in the container component 60 instead of on a desktop. To this end, the widgets for use in container component 60 are locally hosted widgets, as opposed to web widgets, which are typically remotely hosted.

Figure 6:
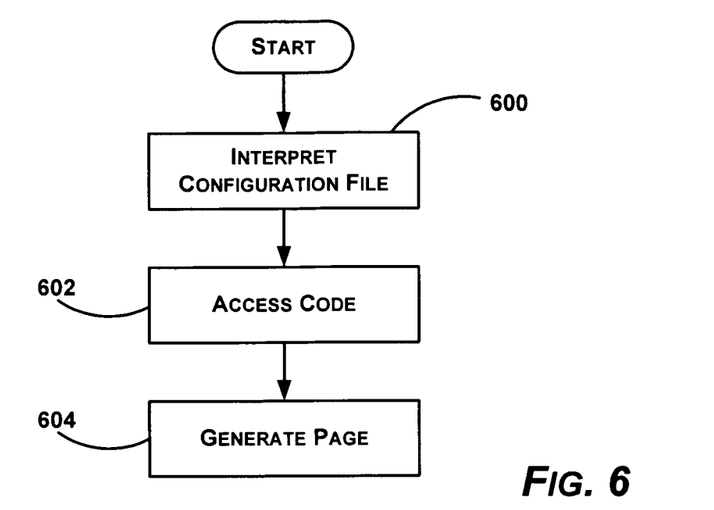
FIG. 6 is a flow diagram representing steps for generating a widget page in accordance with an embodiment.

The parser 72, the library 74, and the page composer 76 are used to generate a page fragment 77 (FIG. 5) from one of the widget configuration files 90 for display in the user interface component 60. The page fragment 77 represents the display of the widgets 64 in the user interface component 60, as shown in FIG. 4. FIG. 6 is a flow diagram representing steps for generating a widget page 77 in accordance with an embodiment. Beginning at step 600, the configuration file 90 is parsed, for example by the parser 72. The parser 72, which may be, for example, an XML interpreter, interprets the tags within the configuration file 90. As described above, the configuration file may include HTML 96 for the page composer 76 to build a page in the user interface 60.

At step 602, the widget host container component 60 accesses code utilized by the configuration file 90. As part of the interpretation of the configuration file 90, calls to code, such as JavaScript code, may be parsed. To this end, the library 72 may include code, such as JavaScript, that performs the functions and action of the code referenced in the configuration file 90. The library 72 may locally store the code, or may include mapping to code stored somewhere remote from the library 72, for example in the database 80 or a separate database. This code may be maintained with the widget host container component 60 or may be stored on a server, for example.

At step 604, the page fragment 77 is built for the widget, for example by the page composer 76. The parser 72 and the library 74 may, for example, develop the page fragment 77 in accordance with an object model, such as the Document Object Model. This page fragment 77 will be accessed and displayed by the user interface component 60.

If configuration files 90 are stored in the database 80, then the parser 72, the library 74, and the page composer 76 may be included in the widget host container component 60, and the page fragments 77 may be built locally. Alternatively, built page fragments 77 may be stored in the database 80, and the parser 72, the library 74, and the page composer 76 may be used to generate the page fragments, but are not necessarily used locally. The stored page fragments 77 may be associated with the user interaction environment 50, for example stored in the database 80. Ultimately, once a page fragment 77 is built and instantiated locally in the user interface 60, then the configuration file 30, the parser 72, the library 74, and the page composer 76 should not be needed again for that widget.

As part of the features of the widget host container component 60, a component designer may define what widgets are available for use with the widget host container component 60. To this end, the widget host container component 60 may include a selector component 78 (FIG. 5) for selecting widget configuration files 90 for use with the user interaction environment 50. In addition, a privileges component 79 may be provided so that a developer (i.e., a person utilizing the rapid application development tool 40 to build the user interaction environment 50) or administrator may limit the widgets available to specific users of the user interaction environment 50. These limitations may be set, for example, via the selector component 78, by widgets or widget pages that are actually available at the database 80, and/or by security or privileges set by the developer or an administrator via the privileges component 79.

Figure 7:
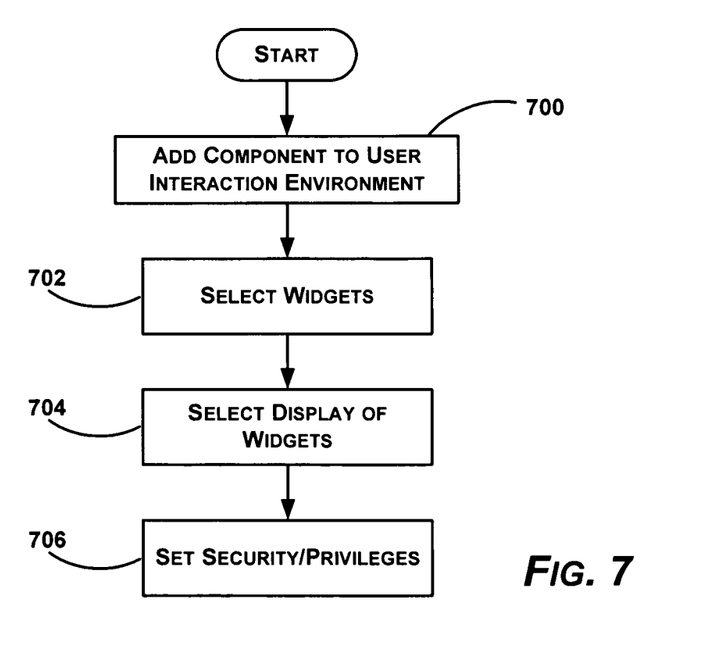
FIG. 7 is a flow chart representing steps for building a user interaction environment with the widget host container component of FIG. 5 in accordance with an embodiment.

FIG. 7 is a flow chart representing steps for building an application or other user interaction environment including the widget host container component 60 in accordance with an embodiment. In step 700, a developer adds the widget host container component 60 to the user interaction environment 50, for example by dragging and dropping a task flow including the widget host container component 60 into a region of the side bar 54. At step 702, the developer selects, for example via the selector component 78, one or more widgets that may be used with the widget host container component 60. These widgets are available, for example, via the Internet, or may be provided by the designer of the widget host container component 60. At step 704, the developer may select how to display the selected widgets, for example via the widget selector component 78. As examples, a developer may select to require display of all of the widgets that have been selected, or may allow selection by a user of particular widgets via the drop-down menu 62. At step 706, if desired, security and/or privileges may be applied to the widget host container component 60, for example via the privileges component 79, so that different users may have different selections of widgets available. Alternatively, the developer may provide or turn on a feature for an administrator of the user interaction environment 50 to set security and or privileges for widgets.

During use, the selected widgets 64 are displayed by the widget host container component 60 at the desktop user interface 60. The page fragments 77 are accessed and displayed in the user interface 60. If desired, tabs or other features may be provided for organizing the widgets.

The widget host container component 60 provides an enterprise solution for making widgets, similar to desktop widgets, available on user's computers throughout a network. The widget host container component 60 allows use of widgets in an enterprise user interaction environment. A developer or administrator may limit particular widgets based upon security and/or privileges. The developer may choose to display the widgets in multiple different regions of the user interaction environment 50. A user may select one or more of the widgets for use via the drop-down menu 62 or other selection device provided by the developer. The widgets may interact with data available to the user interaction environment 50. This data may be, for example, business data available on a network.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer system comprising:
   one or more processing devices; and
   a memory including executable instructions that, when executed collectively by the one or more processing devices, cause the computer system to implement at least:
      an enterprise application having a graphical user interface component, the graphical user interface component of the enterprise application configurable by an application development tool, the graphical user interface component of the enterprise application enabling a user to access a locally hosted widget to be displayed within the enterprise application; and
      the application development tool configured to receive selection of the locally hosted widget to be provided within the graphical user interface component of the enterprise application, the application development tool including a widget host container component for configuring the selected locally hosted widget, the application development tool further configured to manage a security privilege for the widget host container component, the widget host container component comprising:
         a user interface component for accessing and displaying the selected locally hosted widget within the graphical user interface component of the enterprise application; and
         a rendering component for parsing a widget configuration file of the selected locally hosted widget to be displayed in the user interface component.

2. The computer system of claim 1, wherein the rendering component comprises an XML parser.

3. The computer system of claim 1, wherein the rendering component comprises a JavaScript library.

4. The computer system of claim 1, wherein the rendering component comprises a library that maps calls to code stored on a local network.

5. The computer system of claim 1, wherein the user interface component displays a page composed from the parsed widget configuration file.

6. The computer system of claim 1, wherein the user interface component comprises a user selection device for selecting the locally hosted widget to be displayed.

7. The computer system of claim 1, wherein the widget host container component further comprises a widget selector component for selecting the locally hosted widget from a set of available widgets.

8. The computer system of claim 1, wherein the widget host container component comprises a feature to permit widget availability based upon at least the security privilege.

9. A computer system, comprising:
   one or more processing devices; and a memory including executable instructions that, when executed collectively by the one or more processing devices, cause the computer system to implement at least:

an enterprise application having a graphical user interface component, the graphical user interface component of the enterprise application configurable by a rapid application development tool, the graphical user interface component of the enterprise application enabling a user to access a web widget to be displayed within the enterprise application; and     a user interface container for the rapid application development tool configured to receive selection of the web widget to be provided within the graphical user interface component of the enterprise application, the user interface container enabling a developer to embed the web widget into the enterprise application using the rapid application development tool, the user interface container comprising a rendering engine for instantiating a widget configuration file for the web widget, the rapid application development tool further configured to manage a security privilege for the graphical user interface container component, the user interface container comprising:

a first component configured to parse the widget configuration file;

a second component configured to run code in the widget configuration file; and         a third component configured to compose a page from the widget configuration file.

10. The computer system of claim 9, further comprising a user interface for displaying the page.

11. The computer system of claim 10, wherein the user interface comprises a user selection device for selecting the web widget to be displayed.

12. The computer system of claim 9, wherein the user interface container further comprises a widget selector component for selecting available widgets.

13. The computer system of claim 10, wherein the user interface comprises a feature to permit widget availability based upon at least the security privilege.

14. A method comprising:

operating, by a computer device, a rapid application development tool configured to implement a widget host container component, the widget host container component configured to embed one or more widgets within an enterprise user interaction environment, the rapid application development tool further configured to manage a security privilege for the widget host container component;

forming, by the computer device, the enterprise user interaction environment using the rapid application development tool, the enterprise user interaction environment configured to enable a user to access the one or more widgets to be displayed from within the enterprise user interaction environment;

installing, by the rapid application development tool, the widget host container component in the enterprise user interaction environment;

receiving, from a developer, a selection of a particular widget of the one or more widgets to be provided within the enterprise user interaction environment;

enabling the particular widget to be embedded into the enterprise user interaction environment using the widget host container; and     displaying a user interface of the widget host container.

15. The method of claim 14, further comprising:

selecting widgets for use with the widget host container.

16. The method of claim 14, further comprising:

selecting a manner for widgets to be displayed by the user interface of the widget host container.

17. The method of claim 14, further comprising:

setting privileges for the widget host container, the privileges defining widgets capable of display by the user interface of the widget host container based at least in part on the security privilege.

18. The method of claim 14, further comprising:

setting security settings for the widget host container, the security settings defining widgets capable of display by the user interface of the widget host container based at least in part on the security privilege.

19. The method of claim 14, further comprising:

providing a selection tool for user selection of one or more widgets capable of display by the user interface of the widget host container.

* * * * *

UNITED STATES PATENT AND TRADEMARK OFFICE
CERTIFICATE OF CORRECTION

| | | |
|---|---|---|
| PATENT NO. | : 8,719,896 B2 | Page 1 of 1 |
| APPLICATION NO. | : 12/211784 | |
| DATED | : May 6, 2014 | |
| INVENTOR(S) | : Poulsen et al. | |

It is certified that error appears in the above-identified patent and that said Letters Patent is hereby corrected as shown below:

On the title page column 1, item 75 under Inventors, line 1, delete "Thomas" and insert -- Tom --, therefor.

In the Specification

In column 5, line 28, delete "FIG. 2" and insert -- FIG. 2. --, therefor.

In column 7, line 9, delete "and or" and insert -- and/or --, therefor.

Signed and Sealed this
Fourteenth Day of October, 2014

Michelle K. Lee
*Deputy Director of the United States Patent and Trademark Office*